(12) United States Patent
Mednick et al.

(10) Patent No.: US 10,698,472 B2
(45) Date of Patent: Jun. 30, 2020

(54) INSTRUCTION SUBSET IMPLEMENTATION FOR LOW POWER OPERATION

(71) Applicant: ADVANCED MICRO DEVICES, INC., Sunnyvale, CA (US)

(72) Inventors: Elliot H. Mednick, Boxborough, MA (US); Edward McLellan, Boxborough, MA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 92 days.

(21) Appl. No.: 15/795,719

(22) Filed: Oct. 27, 2017

(65) Prior Publication Data

US 2019/0129489 A1    May 2, 2019

(51) Int. Cl.
*G06F 1/324*      (2019.01)
*G06F 12/084*    (2016.01)
(Continued)

(52) U.S. Cl.
CPC ............ *G06F 1/324* (2013.01); *G06F 1/3243* (2013.01); *G06F 1/3287* (2013.01); *G06F 1/3293* (2013.01); *G06F 3/065* (2013.01); *G06F 3/068* (2013.01); *G06F 3/0619* (2013.01); *G06F 3/0625* (2013.01); *G06F 11/1666* (2013.01); *G06F 12/0811* (2013.01); *G06F 12/0875* (2013.01); *G06F 9/3009* (2013.01); *G06F 9/3877* (2013.01); *G06F 12/084* (2013.01);
(Continued)

(58) Field of Classification Search
CPC ........ G06F 1/324; G06F 3/068; G06F 1/3243; G06F 1/3293; G06F 3/0619; G06F 3/065; G06F 12/084; G06F 12/0875; G06F 3/0625; G06F 9/3009; G06F 9/3877; G06F 2212/452
See application file for complete search history.

(56) References Cited

U.S. PATENT DOCUMENTS 5,481,693 A * 1/1996 Blomgren ........... G06F 9/30014
703/26
5,685,009 A * 11/1997 Blomgren ........... G06F 9/30014
712/225

(Continued)

OTHER PUBLICATIONS

Carvalho, Adriano, et al. "Full virtualization on low-end hardware: A case study." IECON 2016—42nd Annual Conference of the IEEE Industrial Electronics Society. IEEE, 2016. (Year: 2016).*

(Continued)

*Primary Examiner* — Francisco A Grullon

(57) ABSTRACT

A heterogeneous processor system includes a first processor implementing an instruction set architecture (ISA) including a set of ISA features and configured to support a first subset of the set of ISA features. The heterogeneous processor system also includes a second processor implementing the ISA including the set of ISA features and configured to support a second subset of the set of ISA features, wherein the first subset and the second subset of the set of ISA features are different from each other. When the first subset includes an entirety of the set of ISA features, the lower-feature second processor is configured to execute an instruction thread by consuming less power and with lower performance than the first processor.

17 Claims, 5 Drawing Sheets

(51) Int. Cl.
*G06F 12/0875* (2016.01)
*G06F 3/06* (2006.01)
*G06F 1/3293* (2019.01)
*G06F 1/3234* (2019.01)
*G06F 12/0811* (2016.01)
*G06F 11/16* (2006.01)
*G06F 1/3287* (2019.01)
*G06F 9/38* (2018.01)
*G06F 9/30* (2018.01)

(52) U.S. Cl.
CPC ............... *G06F 2212/1016* (2013.01); *G06F 2212/286* (2013.01); *G06F 2212/452* (2013.01)

(56) References Cited

U.S. PATENT DOCUMENTS

| | | | | |
|---|---|---|---|---|
| 5,781,750 | A * | 7/1998 | Blomgren | G06F 9/30145 703/26 |
| 6,076,155 | A * | 6/2000 | Blomgren | G06F 9/30094 712/225 |
| 2004/0123087 | A1 * | 6/2004 | Morris | G06F 9/4405 713/1 |
| 2004/0199727 | A1 * | 10/2004 | Narad | G06F 12/0835 711/138 |
| 2008/0263324 | A1 * | 10/2008 | Sutardja | G06F 1/3203 712/43 |
| 2009/0216950 | A1 * | 8/2009 | McCalpin | G06F 12/0833 711/122 |
| 2014/0298060 | A1 * | 10/2014 | Hooker | G06F 1/3293 713/323 |
| 2017/0220474 | A1 * | 8/2017 | Dice | G06F 9/468 |
| 2018/0239702 | A1 * | 8/2018 | Farmahini | G06F 12/0813 |

OTHER PUBLICATIONS

Dinaburg, Artem, et al. "Ether: malware analysis via hardware virtualization extensions." Proceedings of the 15th ACM conference on Computer and communications security. ACM, 2008. (Year: 2008).*

* cited by examiner

INSTRUCTION SUBSET IMPLEMENTATION FOR LOW POWER OPERATION

BACKGROUND

Battery-powered computing devices, such as mobile devices, have become commonplace. A typical mobile device operates over a wide performance range according to workload requirements. Different performance ranges are conventionally mapped to different operating modes, with power consumption proportionally related to performance. For example, in a low-power mode, the mobile device may provide a small amount of computational capacity, such as to maintain radio contact with a cellular tower and consume a relatively low amount of power. In a high-performance mode, the mobile device may be subject to high processing intensity tasks such as gaming or web browsing, and therefore consume a relatively high amount of power.

Processor cores within System on Chip (SoC) designs generally utilize more power as performance increases due to an increase in clock frequency and/or usage of additional logic elements. Increasing battery life is important to users of mobile devices that operate on battery power, sometimes for extended periods of time. Accordingly, there is a need for efficient, low power systems that deliver scalable computational capacity with diminishing energy cost.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Reducing power in high-performance processors can be difficult due to the techniques required to achieve high performance, such as implementation of complex instructions, deep pipelining, superscalar capabilities and aggressive speculative operations. Conventional processors generally employ multiple processor cores, wherein each of the processor cores has the same performance, frequency, and power relative to each other. An operating system schedules tasks to each core equally and performs similar power management on each core. However, by utilizing processors having different levels of performance on a common die, the processors may be employed differently. As described herein, rather than lowering power required for operation by scaling the frequency and/or voltage of processors, FIGS. 1-5 describe systems and methods for utilizing heterogeneous processors in which a low-feature processor implements only a subset of a full instruction set. By utilizing a low-feature processor intended for power execution of lower priority tasks, overall power consumption by the processor is decreased.

In some embodiments, a heterogeneous processor system includes a first processor and a second processor implementing an instruction set architecture (ISA) including a set of ISA features. The first processor is a high-feature processor configured to support a first subset (or entirety) of the set of ISA features. The second processor is a low-feature processor configured to support a subset of the set of ISA features. By implementing only a subset of the complete set of ISA features at the low-feature processor, greater power reduction is achieved when switching tasks between the high-feature processor and the low-feature processor.

The heterogeneous processor system may turn off high-feature processors when not in use to conserve energy. Because the low-feature processors use less power, energy efficiency may increase (e.g., such as while operating mobile devices on batteries) the more the low-feature processor is used (instead of using the high-feature processors). For example, the low-feature processors may support instruction execution of low priority processes such as operating system (OS) maintenance, timer support and various monitor functions that are used to allow a device to appear powered on and available through periodic wake ups while most of the time it is in fact powered off. By minimizing the power needed to support these operations, battery life can be greatly extended, thereby improving the efficiency of lower power operations and improving battery life. Accordingly, instructions executed on the low-feature processors offer improvements in power savings relative to other implementations that employ other low power techniques, but continue to execute those instructions on full-feature processors.

Figure 1:
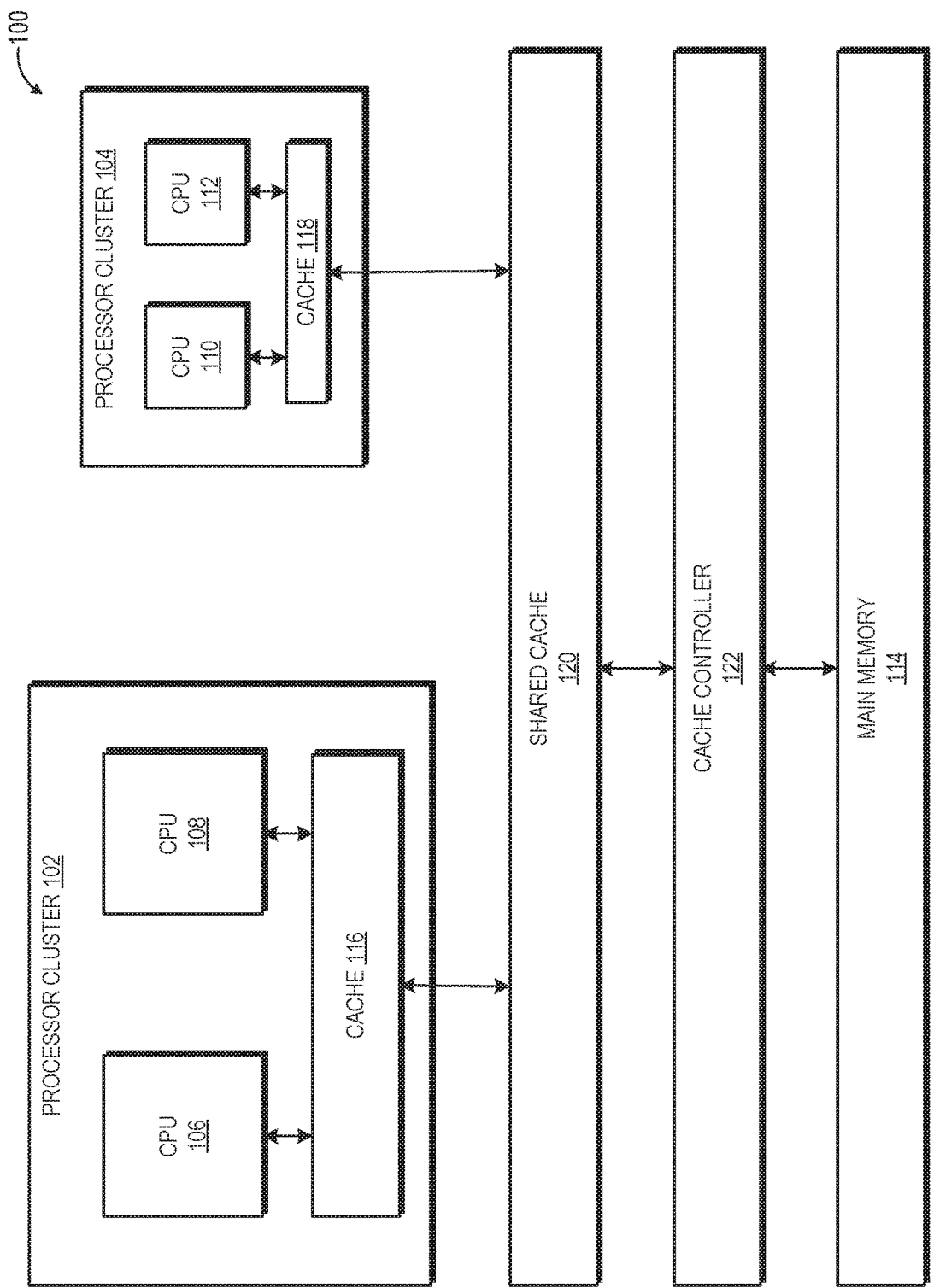
FIG. 1 is a block diagram illustrating a heterogeneous processor system in accordance with at least some embodiments.

FIG. 1 is a block diagram illustrating a heterogeneous processor system 100 in accordance with at least some embodiments. In the depicted example, the heterogeneous processor system 100 includes a plurality of processor clusters, such as processor cluster 102 and processor cluster 104. Each processor cluster 102, 104 may include one or more processors or processor cores (e.g., central processing unit (CPU), graphics processing unit (GPU), digital signal processor (DSP), and the like). In the embodiment of FIG. 1, the processor cluster 102 includes a plurality of central processing unit (CPU) cores 106 and 108, which are relatively faster and consume more power than the CPU cores 110 and 112 in the processor cluster 104.

The processor clusters 102 and 104 include cache memory used by the corresponding processors or processor cores in the clusters to reduce the average time to access data from a main memory 114. In some embodiments, the cache memory and the main memory 114 are organized as a hierarchy of cache levels (e.g., level one (L1), level two (L2), level three (L3)). For example, in the embodiment illustrated in FIG. 1, the processor cluster 102 includes a cache 116 shared by the CPU cores 106 and 108. The processor cluster 104 includes a cache 118 shared by the CPU cores 110 and 112. It should be appreciated that the caches 116 and 118 may be implemented with or without a hierarchy of cache levels. Further, the heterogeneous processor system 100 includes a shared cache 120 shared by the processor clusters 102 and 104.

The heterogeneous processor system 100 also includes a cache controller 122 for monitoring the utilization and performance of the processor clusters 102 and 104 to manage task migration between processor clusters. In some embodiments, the cache controller 122 is configured to monitor the workload of the processor(s) in the processor clusters 102 and 104 and the cache demand of each cache. For example, regarding processor workload, the cache controller 122 may determine processor or CPU utilization, loading, processing latency, instruction execution times, and the like. Additionally, regarding cache demand, the cache controller 122 may monitor memory access (e.g., read and/or write access) to caches 116-120 and determine delays due to, for example, cache misses that may impact the performance of current tasks running on the processor clusters.

As illustrated in FIG. 1, the processor clusters 102 and 104 of heterogeneous processor system 100 are asymmetric relative to each other. The CPU cores 106 and 108 of the processor cluster 102 may be distinguished from the CPU cores 110 and 112 of the processor cluster 104 by, for example, having micro-architectural features that enable relatively more performance but at the cost of additional power when executing a thread. For example, in some embodiments, the processor clusters 102 and 104 utilize, relative to each other, different cache memory sizes, different cache hierarchies, in-order vs. out-of-order execution units, speculative vs. non-speculative execution, different branch prediction mechanisms, and/or different compositions of execution units.

The heterogeneous processor system 100 includes a feature set of an instruction set architecture (ISA) including: (1) an instruction set, (2) a set of resources (e.g., registers and modes for addressing memory) accessible by the instructions of the instruction set, and (3) a set of operating modes in which processors operate to process the instructions of the instruction set. Accordingly, an ISA feature set for a processor is defined as the set of features specified by the ISA that the processor supports. The features may include the instruction set of the ISA supported by the processor, the set of operating modes of the ISA supported by the processor and/or the set of resources of the ISA included by the processor.

In the context of the heterogeneous processors described herein, the processor cluster 102 is asymmetric relative to the processor cluster 104 in that they support different sets or subsets of features of any given ISA feature set. In some embodiments, the processor cluster 102 supports a set of features including all of the features of the ISA and the processor cluster 104 supports a subset of features including less than all of the features of the ISA. In other embodiments, both the processor cluster 102 and the processor cluster 104 support subsets of features including less than all of the features of the ISA. However, the processor(s) and core(s) of processor cluster 104 generally supports a subset of features that is smaller than the subset of features supported by the processor(s) and core(s) of processor cluster 102. Accordingly, the processor clusters 102 and 104 are hereinafter referred to as the "high-feature processor" and "low-feature processor," respectively, for ease of reference.

For embodiments in which the high-feature processor 102 supports a set of features including all of the features of the ISA, subsets of instructions executable at the low-feature processor 104 are also executable at the high-feature processor 102. However, at least a portion of the instructions executable at the high-feature processor 102 may not necessarily be executable at the low-feature processor 104. The combination of the set of features supported by the high-feature processor 102 and the subset of features supported by the low-feature processor 104 represents all of the features of the ISA supported by the heterogeneous processor system 100. Although the example of FIG. 1 illustrates two different processors, those skilled in the art will recognize that other embodiments may utilize three or more heterogeneous processors without departing from the scope of the disclosure described herein. The high-feature processor 102 supports features of the ISA generally associated with providing high performance and the low-feature processor 104 supports features generally associated with higher power efficiency. Switching between the high-feature processor 102 and the low-feature processor 104 for execution of instruction threads allows for improved power efficiency. Additionally, by supporting less than the entirety of an ISA feature, the low-feature processor 104 enables a lower power implementation than systems utilizing, for example, heterogeneous processors that both implement identical ISAs but operate with different instructions per cycle (IPC) or having different operating frequencies.

Figure 2:
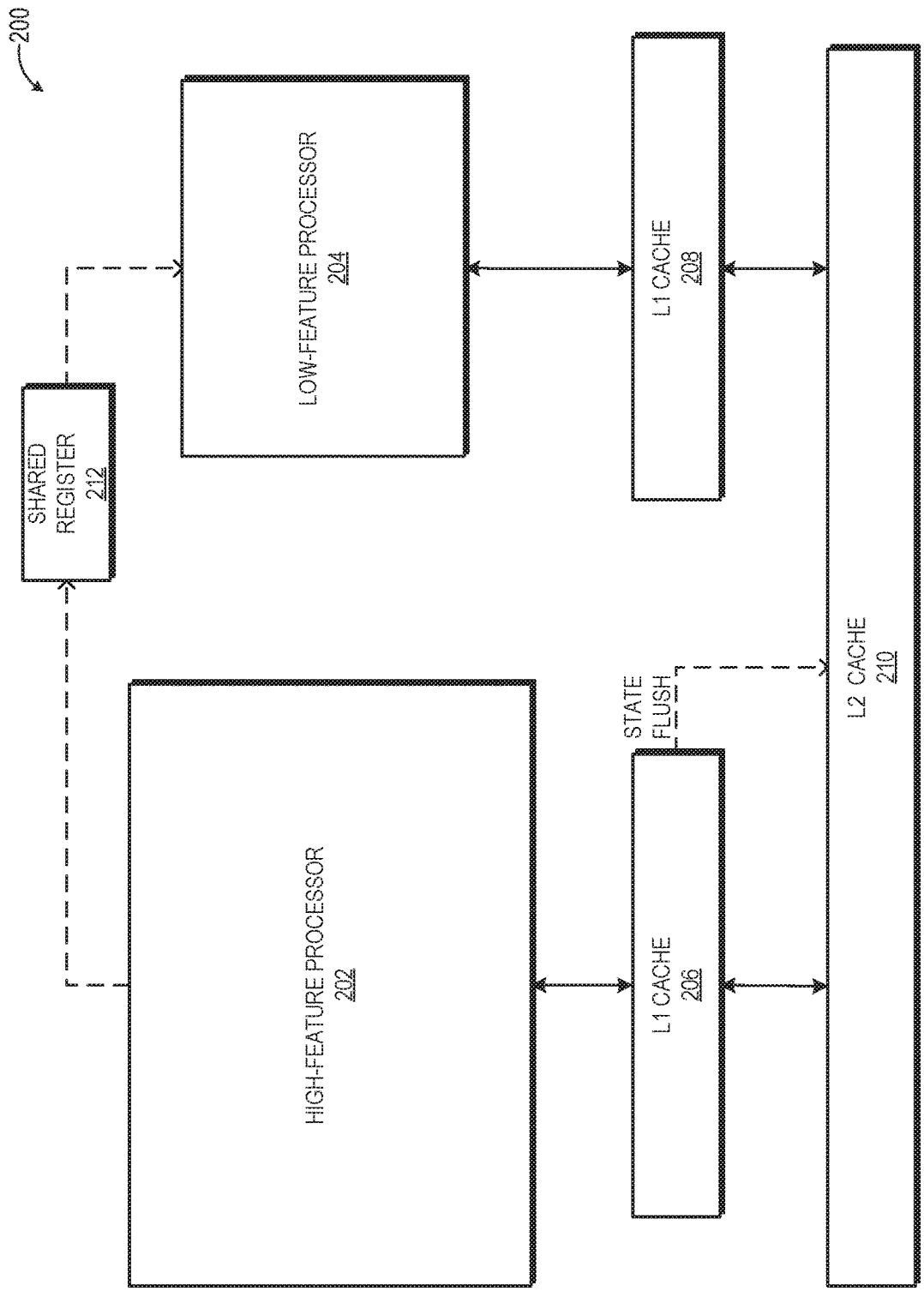
FIG. 2 is a block diagram illustrating an example operation of a heterogeneous processor system in accordance with at least some embodiments.

FIG. 2 is a diagram illustrating an example operation of a heterogeneous processor system in accordance with at least some embodiments. The heterogeneous processor system 200 of FIG. 2 includes a high-feature processor 202 and a low-feature processor 204. The heterogeneous processor system 200 includes an L1 cache 206 for the high-feature processor 202 and a L1 cache 208 for the low-feature processor 204. The heterogeneous processor system 200 further includes a L2 cache 210 shared by the high-feature processor 202 and the low-feature processor 204.

When the high-feature processor 202 is being underutilized (e.g., such as determined by cache controller 122 of FIG. 1 or another system performance monitor), the heterogeneous processor system 200 transitions to a lower-power mode by switching execution of a thread from the high-feature processor 202 to the low-feature processor 204. This switch of execution includes migrating data, such as thread state, used by the high-feature processor 202 from its L1 cache 206 to the L2 cache 210 shared and accessible by both the high-feature processor 202 to the low-feature processor 204. In other embodiments, the thread state of the high-feature processor 202 may be saved to other shared storage, such as lower-level cache (e.g., L3 cache) or to system memory. While the state of the high-feature processor 202 is flushed to shared L2 cache 210, the high-feature processor 202 also saves its registers to a shared register 212. Subsequently, the low-feature processor 204 to which execution is being switched restores to itself the thread state from the shared L2 cache 210 and also receives the register data from the shared register 212.

When the low-feature processor 204 is being overutilized (e.g., such as determined by cache controller 122 of FIG. 1 or another system performance monitor), the heterogeneous processor system 200 transitions to a higher-power mode by switching execution of a thread from the low-feature processor 204 back to the high-feature processor 202. Due to the low-feature processor 204 supporting only a subset of the features defined by an ISA, the heterogeneous processor system 200 also transitions execution from the low-feature processor 204 to the high-feature processor 202 when encountering an instruction that the low-feature processor 204 does not support.

This switch of execution includes migrating data, such as thread state, used by the low-feature processor 204 from its L1 cache 208 to the L2 cache 210 shared and accessible by both the high-feature processor 202 to the low-feature processor 204. In other embodiments, the thread state of the low-feature processor 204 may be saved to other shared storage, such as lower-level cache (e.g., L3 cache) or to system memory. While the state of the low-feature processor 204 is flushed to shared L2 cache 210, the low-feature processor 204 also saves its registers to a shared register 212. Subsequently, the high-feature processor 202 to which execution is being switched restores to itself the thread state from the shared L2 cache 210 and also receives the register data from the shared register 212.

Figure 3:
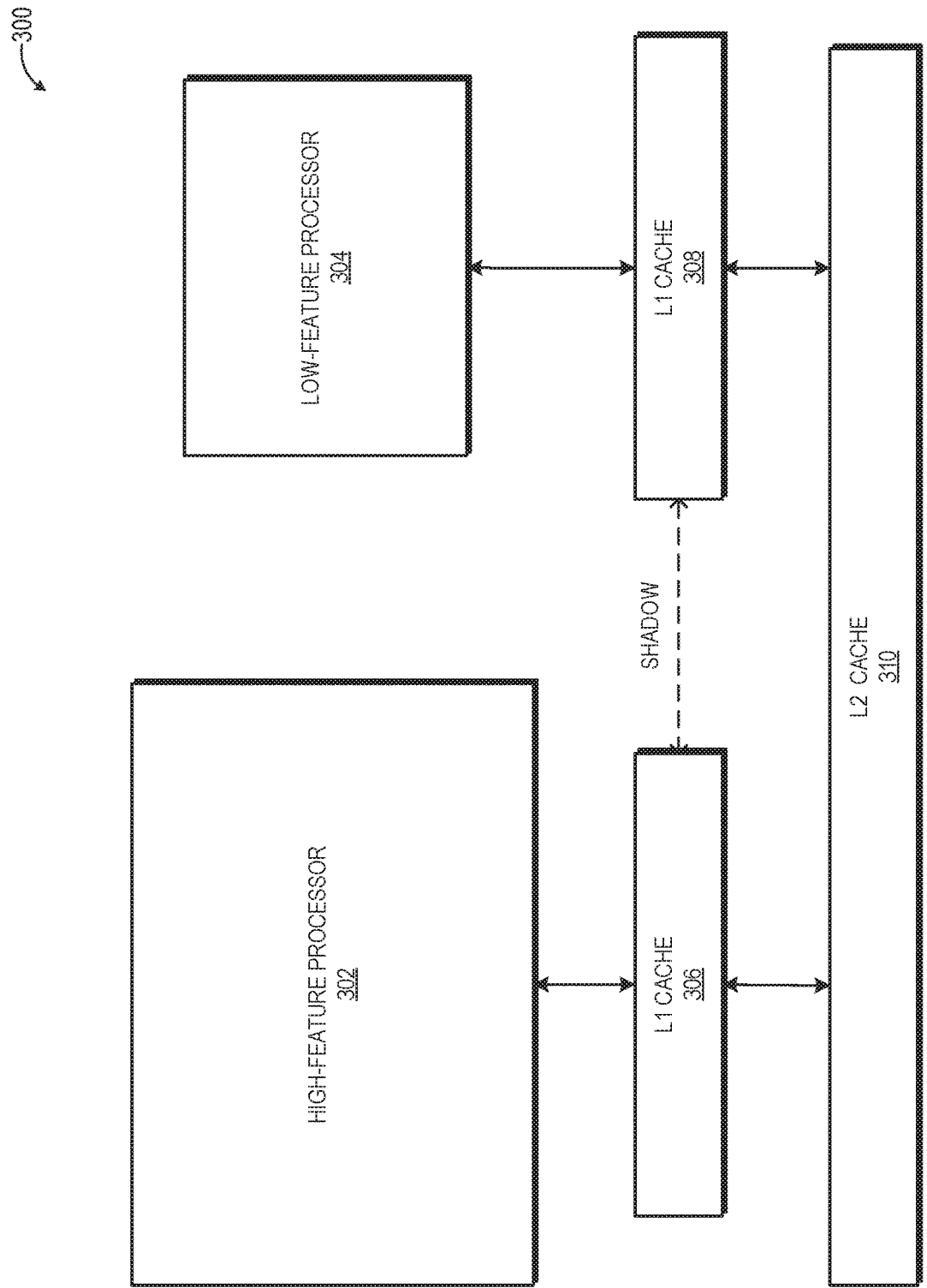
FIG. 3 is a block diagram illustrating another example operation of a heterogeneous processor system in accordance with at least some embodiments.

FIG. 3 is a diagram illustrating another example operation of a heterogeneous processor system in accordance with at least some embodiments. The heterogeneous processor system 300 of FIG. 3 includes a high-feature processor 302 and a low-feature processor 304. The heterogeneous processor system 300 includes a L1 cache 306 for the high-feature processor 302 and a L1 cache 308 for the low-feature processor 304. The heterogeneous processor system 300 further includes a L2 cache 310 shared by the high-feature processor 302 and the low-feature processor 304.

When the high-feature processor 302 is being underutilized (e.g., such as determined by cache controller 122 of FIG. 1 or another system performance monitor), the heterogeneous processor system 300 transitions to a lower-power mode by switching execution of a thread from the high-feature processor 302 to the low-feature processor 304. However, rather than flushing thread states to the L2 cache 310 (such as previously described relative to FIG. 2), states are maintained in consistency by writing the states of both the high-feature processor 302 and the low-feature processor 304 to the L1 caches 306, 308 (i.e., shadowing). For example, when a thread state of a thread executing at the high-feature processor 302 is written to L1 cache 306, that same thread state is also written to L1 cache 308 of the low feature processor 304. Similarly, register writes (not shown) are also shadowed. Subsequently, the low-feature processor 304 to which execution is being switched restores to itself the thread state from its L1 cache 308, which contains a copy of thread state data of the high-feature processor 302.

When the low-feature processor 304 is being overutilized (e.g., such as determined by cache controller 122 of FIG. 1 or another system performance monitor), the heterogeneous processor system 300 transitions to a higher-power mode by switching execution of a thread from the low-feature processor 304 back to the high-feature processor 302. Due to the low-feature processor 304 supporting only a subset of the features defined by an ISA, the heterogeneous processor system 300 also transitions execution from the low-feature processor 304 to the high-feature processor 302 when encountering an instruction that the low-feature processor 304 does not support. Similar to the operations discussed above, the high-feature processor 302 to which execution is being switched restores to itself the thread state from its L1 cache 306, which contains a copy of thread state data of the low-feature processor 304. Additionally, with the low-feature processor 304 being a simpler processor (e.g., due to its micro-architecture only having to support a subset of the full ISA supported by heterogeneous processor system 300), shadow writes of states from the low-feature processor 304 to the L1 cache 306 are faster than the opposite direction of data migration.

Figure 4:
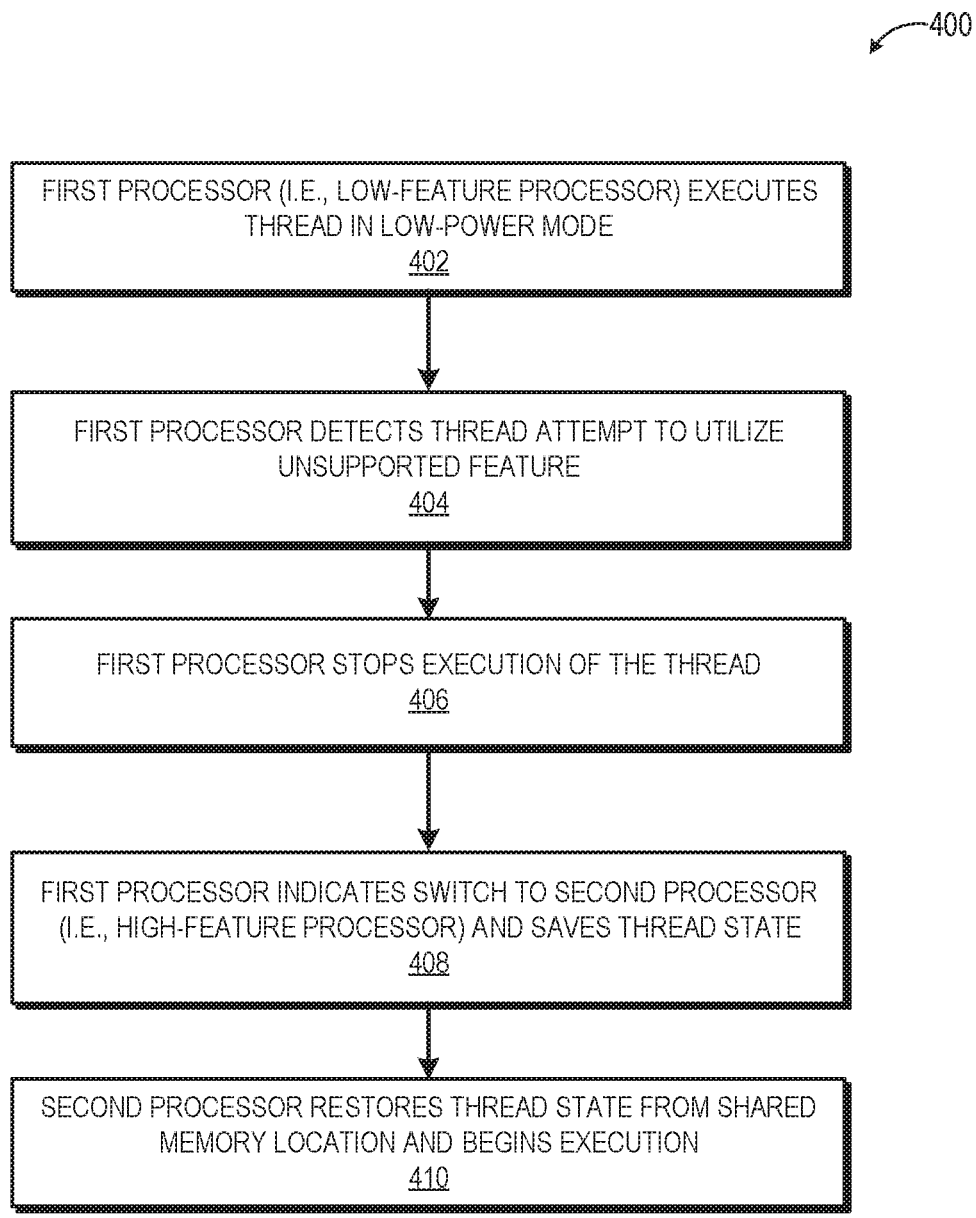
FIG. 4 is a flow diagram illustrating an operation of a heterogeneous processor system in accordance with at least some embodiments.

Referring now to FIG. 4, illustrated is a method 400 of operation of a heterogeneous processor system in accordance with at least some embodiments. At block 402, a first of the heterogeneous processors (e.g., low-feature processor 304 of FIG. 3) is executing an application thread in a low-power mode. Examples of low-power modes include: a mode entered by the processor in response to an instruction that instructs the processor to halt execution of a thread, a mode in which an external bus clock to the processor is disabled, a mode in which the processor disables the clock signals to a portion of its circuitry, a mode in which the processor disables power to a portion of its circuitry, and the like. The low power modes may include various Advanced Configuration and Power Interface (ACPI) Processor states, more commonly known as C-states.

At block 404, the first processor which is currently executing the thread (e.g., low-feature processor 304 of FIG. 3), detects that the thread is attempting to employ a feature of an ISA feature set that is unsupported by the first processor. Depending upon the nature of the particular feature, the first processor may detect the unsupported feature in different ways. For example, an instruction decoder may decode an instruction that is unsupported by the first processor or an execution unit may detect that an instruction is attempting to access a control register that is unsupported by the first processor and/or access a particular control register bit or field place the processor into a particular operating mode defined by the ISA (but unsupported by the first processor).

At block 406, the first processor stops executing the thread in response to detecting the attempt by the thread to employ the unsupported feature at block 404. For example, if an instruction decoder decodes an unsupported instruction, it may trap to a microcode routine that handles illegal instruction exceptions, and the microcode routine may stop the execution of subsequent instructions of the thread. At block 408, the first processor indicates a switch to a second processor (e.g., the high-feature processor 302 of FIG. 3) to execute the thread and saves the thread state to a shared memory location. For example, as described relative to FIGS. 2-3, the thread state may be flushed to a shared L2 cache. In addition to the thread state, the first processor may also transfer other data that is not necessary for the second processor to execute the thread, but which may nevertheless enable the second processor to execute the thread faster, such as some or all of the contents of one or more cache memories of the first processor. At block 410, the second processor (e.g., the high-feature processor 302 of FIG. 3) restores the thread state from the shared memory location and begins executing the thread.

Figure 5:
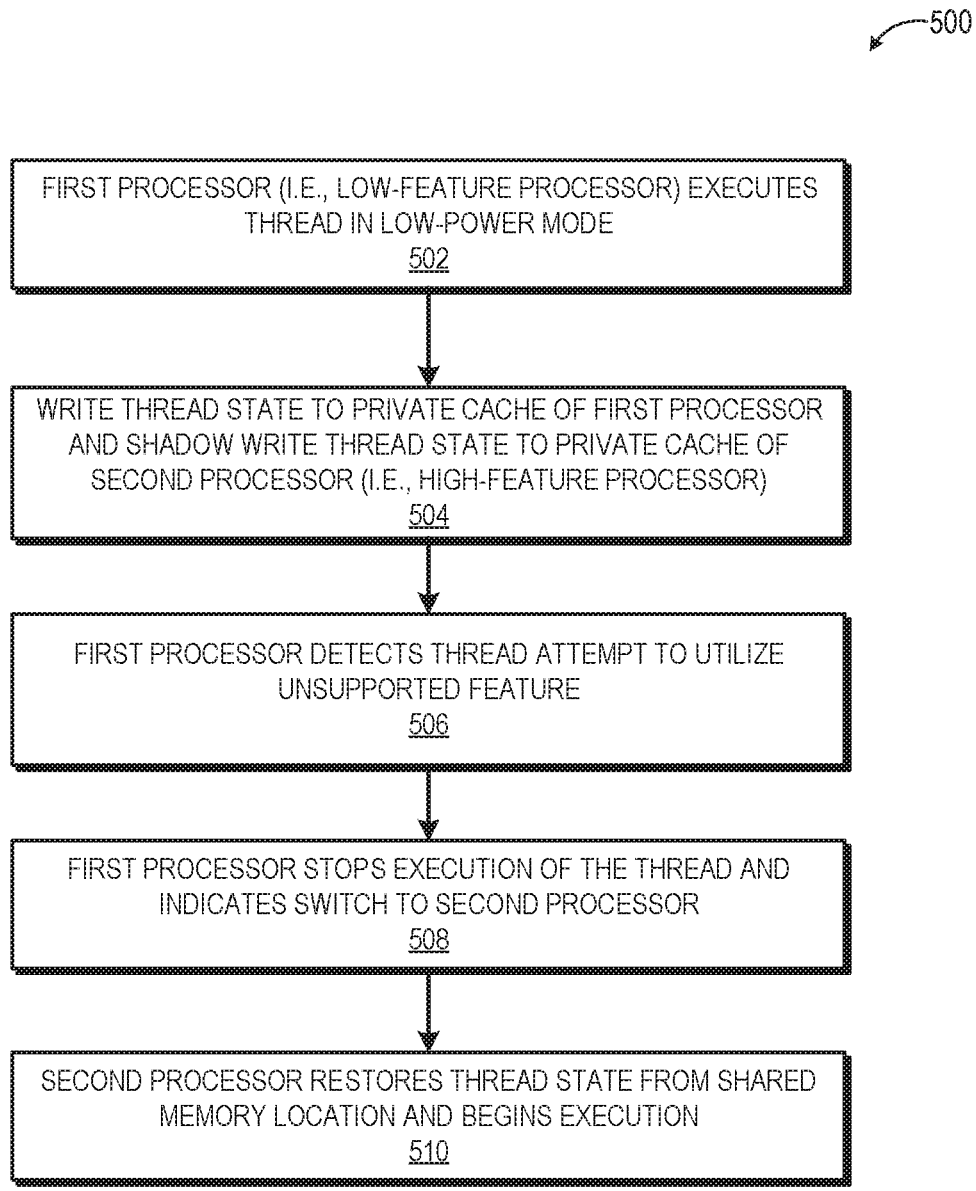
FIG. 5 is a flow diagram illustrating another operation of a heterogeneous processor system in accordance with at least some embodiments.

FIG. 5 is a flow diagram illustrating another example method 500 of operation of a heterogeneous processor system in accordance with at least some embodiments. At block 502, a first of the heterogeneous processors (e.g., low-feature processor 304 of FIG. 3) is executing an application thread in a low-power mode. Examples of low-power modes include: a mode entered by the processor in response to an instruction that instructs the processor to halt execution of a thread, a mode in which an external bus clock to the processor is disabled, a mode in which the processor disables the clock signals to a portion of its circuitry, a mode in which the processor disables power to a portion of its circuitry, and the like. The low power modes may include various Advanced Configuration and Power Interface (ACPI) Processor states, more commonly known as C-states.

At block 504, a thread state of the thread executing at the first processor is written to a private cache of the first processor (e.g., L1 cache 308 of FIG. 3). Additionally, the thread state of the thread executing at the first processor is shadow written to a private cache of a second processor (e.g., L1 cache 306 of high-feature processor 302 of FIG. 3). In addition to the thread state, the first processor may also transfer other data, such as register data.

At block 506, the first processor which is currently executing the thread (e.g., low-feature processor 304 of FIG. 3), detects that the thread is attempting to employ a feature of an ISA feature set that is unsupported by the first processor. Depending upon the nature of the particular feature, the first processor may detect the unsupported feature in different ways. For example, an instruction decoder may decode an instruction that is unsupported by the first processor or an execution unit may detect that an instruction is attempting to access a control register that is unsupported by the first processor and/or access a particular control register bit or field place the processor into a particular operating mode defined by the ISA (but unsupported by the first processor).

At block 508, the first processor stops executing the thread in response to detecting the attempt by the thread to employ the unsupported feature at block 506. For example, if an instruction decoder decodes an unsupported instruction, it may trap to a microcode routine that handles illegal instruction exceptions, and the microcode routine may stop the execution of subsequent instructions of the thread. The first processor also indicates a switch to a second processor (e.g., the high-feature processor 302 of FIG. 3) to execute the thread. At block 510, the second processor (e.g., the high-feature processor 302 of FIG. 3) restores the thread state from its private cache (e.g., the L1 cache 306 of FIG. 3) and begins executing the thread.

It should be understood that although the blocks of the embodiments of FIGS. 4 and 5 are described in a particular order, some blocks may be performed in a different order and/or in parallel with one another. For example, the operations may occur in the opposite order to migrate data from the high-feature processor to the low-feature processor for reduction in power consumption, as previously discussed in more detail with respect to FIGS. 2-3.

Switching operation from the high-feature processor to the low-feature processor costs performance but saves power. Further, the low-feature processor not only consumes less power than the high-feature processor but is also generally more power efficient as well. It should be noted that the power-to-performance ratio is not linear. Power consumed increases at approximately the square of operating frequency, and also increases geometrically relative to the amount of hardware needed to improve inter-process communications (IPC). Accordingly, for example, low-feature processors are not only lower power but their performance per watt is also better than higher-feature, faster processors.

When operating in low power modes, switching to the low-feature processor allows for a disproportionate savings of power relative to the amount of performance lost. By implementing only a portion of an ISA instruction set at the low-feature processor, the amount of hardware necessary for the low-feature processor may be decreased and the power differential of operations between the high-feature processor and the low-feature processor increased. In one example embodiment, computationally-intensive instructions such as floating point and operations such as translation lookaside buffer (TLB) table walks are not implemented in the low-feature processor, which decreases the power required for operation of the low-feature processor and also reduces the overhead of having the low-feature processor in addition to the operations of the high-feature processor.

In some embodiments, the heterogeneous processor systems described herein further include a hardware abstraction layer implemented at the low-feature processor to reduce incidences where a switch back to the high-feature processor is needed. In particular, the hardware abstraction layer emulates opcodes that were not implemented in the microarchitecture hardware of the low-feature processor. For example, in a low-feature processor that does not include any divide units, a subroutine may be provided in a library that performs divides. When a divide instruction is encountered at the low-feature processor, the low-feature processor may enter an interrupt routine and execute a sequence of instructions written in the library to perform the divide rather than switching execution back to the high-feature processor. This process is computationally-inefficient, but operates to allow for handling of infrequently encountered instructions. Accordingly, if there is an instruction that the low-feature processor encounters in a lower power mode and high performance is not required, that instruction can be emulated in the hardware abstraction layer instead of switching to a higher power mode.

Extensive use of this emulation support would lead to poor power efficiency, so in addition, the high-feature processor is instrumented with monitors to assist in the determination of when to switch to the low-feature processor. Accordingly, while operating on the low-feature processor, if an operation that is not implemented is encountered, or if the use of emulation software exceeds a threshold, an exception mechanism forces a switch back to the high-feature processor. In this way, the low-feature processor can be used to balance power and performance, and extend the useful low power range of the combined heterogeneous processor system.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A heterogeneous processor system, comprising:
a first processor implementing an instruction set architecture (ISA) including a set of ISA features and configured to support a first subset of the set of ISA features;
a second processor implementing the ISA including the set of ISA features and configured to support a second subset of the set of ISA features, wherein the first subset and the second subset of the set of ISA features are different from each other; and
wherein the second processor is further configured to write a state of an instruction thread being executed at the second processor to a first private cache memory associated with the second processor and shadow write a copy of the state of the instruction thread to a second private cache memory associated with the first processor.

2. The heterogeneous processor system of claim 1, wherein the first subset comprises an entirety of the set of ISA features.

3. The heterogeneous processor system of claim 1, wherein the second processor is further configured to:
execute an instruction thread by consuming less power and with lower performance than the first processor.

4. The heterogeneous processor system of claim 1, wherein the second processor is further configured to:
detect that an instruction thread, while being executed at the second processor, encounters an instruction not supported by the second subset of the set of ISA features; and
save, in response to encountering the instruction not supported by the second subset, a copy of a state of the instruction thread to a shared memory.

5. The heterogeneous processor system of claim 4, wherein the first processor is further configured to:
restore the state of the instruction thread from the shared memory and to continue execution of the instruction thread.

6. The heterogeneous processor system of claim 4, wherein the first processor is configured to:
restore, in response to encountering an instruction not supported by the second subset of the set of ISA features, the state of the instruction thread from the second private cache memory of the first processor and to continue execution of the instruction thread.

7. The heterogeneous processor system of claim 1, wherein the first processor is further configured to:
detect, while executing an instruction thread at the first processor, an inefficient utilization of the first processor; and
switch execution of the instruction thread from the first processor to the second processor in response to the inefficient utilization.

8. A method, comprising: detecting that an instruction thread, while being executed by a low-feature processor that supports a subset of a set of instruction set architecture (ISA) features, encounters an instruction not supported by the subset of the set of ISA features or by a hardware abstraction layer emulating at least one opcode not supported by a micro-architecture of the low-feature processor; switching execution of the instruction thread to a high-feature processor that supports an entirety of the set of ISA features; and wherein the low-feature processor is further configured to write a state of an instruction thread being executed at the low-feature processor to a first private cache memory associated with the low-feature processor and shadow write a copy of the state of the instruction thread to a second private cache memory associated with the high-feature processor.

9. The method of claim 8, further comprising:
saving, in response to encountering the instruction not supported by the subset of the set of ISA features, a copy of a state of the instruction thread to a shared memory.

10. The method of claim 9, further comprising:
stopping execution of the instruction thread at the low-feature processor;
restoring the state of the instruction thread from the shared memory to the high-feature processor; and
continuing execution of the instruction thread at the high-feature processor.

11. The method of claim 10, further comprising:
saving, in response to encountering the instruction not supported by the subset of the set of ISA features, a copy of register data to a shared register; and
migrating the register data from the shared register to the high-feature processor.

12. The method of claim 8, further comprising:
stopping execution of the instruction thread at the low-feature processor;
restoring, in response to encountering the instruction not supported by the subset of the set of ISA features, the state of the instruction thread from the cache memory of the high-feature processor; and
continuing execution of the instruction thread at the high-feature processor.

13. A method, comprising: detecting, while executing an instruction thread, an inefficient utilization of a high-feature processor that supports a set of instruction set architecture (ISA) features; switching execution of the instruction thread from the high-feature processor to a low-feature processor that supports a subset of the set of ISA features and is configured to emulate, at a hardware abstraction layer, at least one opcode not supported by a micro-architecture of the low-feature processor; and wherein the low-feature processor is further configured to write a state of an instruction thread being executed at the low-feature processor to a first private cache memory associated with the low-feature processor and shadow write a copy of the state of the instruction thread to a second private cache memory associated with the high-feature processor.

14. The method of claim 13, further comprising:
saving, in response to detecting the inefficient utilization of the high-feature processor, a copy of a state of the instruction thread to a shared memory.

15. The method of claim 14, further comprising:
stopping execution of the instruction thread at the high-feature processor;
restoring the state of the instruction thread from the shared memory to the low-feature processor; and
continuing execution of the instruction thread at the low-feature processor.

16. The method of claim 14, further comprising:
saving, in response detecting the inefficient utilization of the high-feature processor, a copy of register data to a shared register; and
migrating the register data from the shared register to the low-feature processor.

17. The method of claim 13, further comprising:
stopping, in response to detecting the inefficient utilization of the high-feature processor, execution of the instruction thread at the high-feature processor;
restoring the state of the instruction thread from the cache memory of the low-feature processor; and
continuing execution of the instruction thread at the low-feature processor.

* * * * *

UNITED STATES PATENT AND TRADEMARK OFFICE
CERTIFICATE OF CORRECTION

PATENT NO.        : 10,698,472 B2
APPLICATION NO.   : 15/795719
DATED             : June 30, 2020
INVENTOR(S)       : Elliot H. Mednick and Edward McLellan It is certified that error appears in the above-identified patent and that said Letters Patent is hereby corrected as shown below:

In the Claims

At Column 11 Line 18, please insert --to-- after "response" and before "detecting"

Signed and Sealed this
Twenty-first Day of February, 2023

Katherine Kelly Vidal
*Director of the United States Patent and Trademark Office*